United States Patent [19]
Scapellati

[11] Patent Number: 6,002,600
[45] Date of Patent: Dec. 14, 1999

[54] REVERSIBLE POLARITY HIGH VOLTAGE POWER SUPPLY

[75] Inventor: Cliff Scapellati, Sayville, N.Y.

[73] Assignee: Spellman High Voltage Co., Hauppauge, N.Y.

[21] Appl. No.: 08/336,181

[22] Filed: Nov. 8, 1994

[51] Int. Cl.[6] .................................................. H02M 7/02
[52] U.S. Cl. ............................................. 363/61; 363/63
[58] Field of Search .................................. 363/61, 59, 63

[56] References Cited

U.S. PATENT DOCUMENTS

| | | | |
|---|---|---|---|
| 3,510,748 | 5/1970 | Sakamoto et al. | 363/63 |
| 3,731,179 | 5/1973 | Rademaker | 363/63 |

FOREIGN PATENT DOCUMENTS

| | | | |
|---|---|---|---|
| 2518527 | 11/1976 | Germany | 363/63 |

*Primary Examiner*—Adolf Denske Berhane
*Attorney, Agent, or Firm*—Gottlieb, Rackman & Reisman, P.C.

[57] ABSTRACT

A high voltage power supply having a high voltage output terminal and capable of receiving an input for providing an alternating voltage signal to the power supply is provided. A voltage multiplier circuit is provided for operating on the alternating voltage signal and generating a high voltage across positive and negative polarity terminals. An electromechanical transducer is preferably provided for moving the multiplier circuit between a first position where the positive polarity terminal is electrically connected to the high voltage output terminal, and a second position where the negative polarity terminal is electrically connected to the high voltage output terminal.

17 Claims, 9 Drawing Sheets

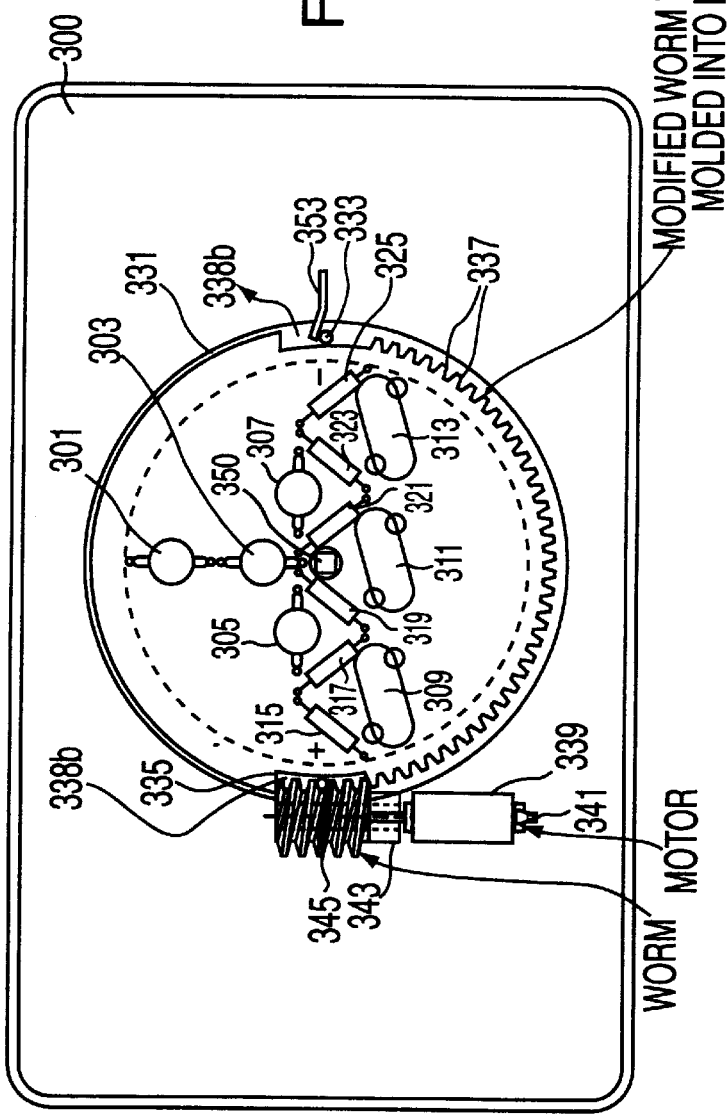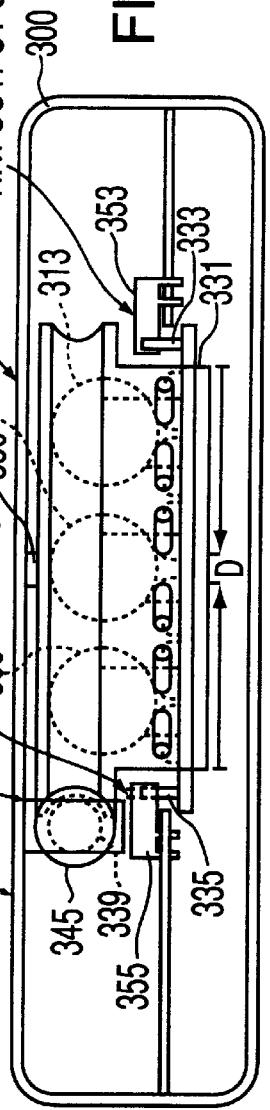

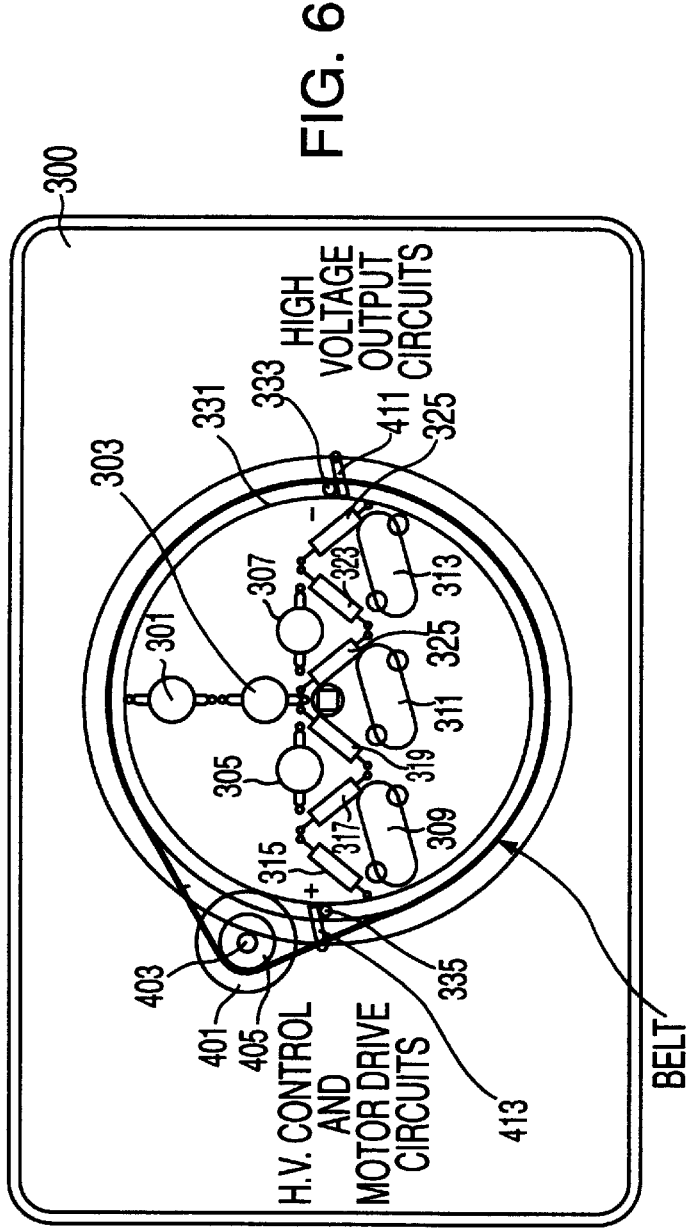
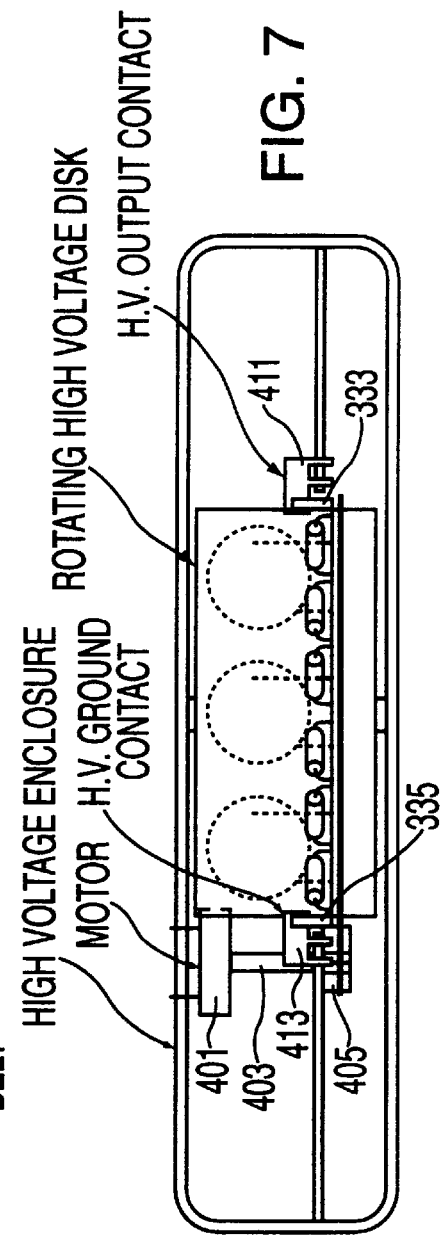

REVERSIBLE POLARITY HIGH VOLTAGE POWER SUPPLY

BACKGROUND OF THE INVENTION

This invention is directed to a high voltage power supply, and, in particular, a high voltage power supply having a multiplier circuit located therein, with the multiplier circuit mounted on a movable plate, such that the positive output and negative output of the multiplier circuit can be selectively switched to provide either a positive or negative high voltage output.

There are many known power supplies in the prior art and three such power supplies are diagrammatically represented in FIGS. 1A, 1B and 1C. In particular, the prior art power supply shown in FIG. 1A includes conventional control circuits 100 coupled to a conventional driver circuit 102. The driver circuit is connected via a transformer 104 to a conventional Cockcroft-Walton multiplier 106. The output of the Cockcroft-Walton multiplier provides the generic high voltage output which is filtered and modified to provide a clean high voltage output. This is a manual high voltage power supply, which means that the user must reconfigure the high voltage circuits by physically disconnecting and connecting key electrical nodes. In particular, the dashed lines 108 indicate the manual links required in order to obtain a positive polarity high voltage output. When dashed lines 108 are connected, solid lines 110 must be disconnected. Alternatively, if a negative polarity high voltage output is desirable, the links shown by the dashed lines 108 must be removed and the electronic links indicated by the solid lines 110 must be connected manually. The circuitry of FIG. 1A requires the high voltage electrodes to be accessed by the user, and presents a safety hazard by exposing the user to energized high voltage circuits. This technique also requires significant time to perform the switchover from positive polarity to negative polarity, thereby making it impracticable for automated system requirements.

With reference to FIG. 1B, a more advanced manual system is provided, including control circuits 112 coupled to driver circuit 114, which is connected via a transformer 116 to a center feed Cockcroft-Walton multiplier circuit 118. By providing a center feed Cockcroft-Walton multiplier circuit, rather than the convention Cockcroft-Walton shown in FIG. 1A, the number of manual links is reduced. In particular, the user would be required to connect dashed wires 120 for a positive polarity high voltage output, and alternatively, solid lines 122 are required to obtain a negative polarity high voltage output. Thus, it can be seen that the total number of manual links that must be connected and disconnected to change the polarity is reduced from six to four. However, this reduction in number of connections does not change the fact that a user is exposed to energized high voltage circuitry which presents a safety hazard. Furthermore, the reduction in number of manual links from six to four does not significantly increase the switchover time in order to make this construction practical for an automated system.

Particular reference is now made to the prior art of FIG. 1C, which illustrates an advancement over the manual technique of FIGS. 1A and 1B. In particular, the circuitry of FIG. 1C includes control circuits 130 electrically connected to driver circuit 132 which is connected via a low voltage relay 134 to either high voltage transformer 136 or high voltage transformer 138. High voltage transformer 136 is connected to Cockcroft-Walton multiplier 140 and high voltage transformer 138 is connected to Cockcroft-Walton multiplier 142. A high voltage relay 144 is connected to the output of Cockcroft-Walton multipliers 140 and 142 and is synchronized with low voltage relay 134. Thus, if a positive polarity is desired the low voltage relay 134 and high voltage relay 144 selectively switch to couple Cockcroft-Walton multiplier 140 to driver 132 and high voltage output 146. Alternatively, if a negative polarity high voltage output is desired the low voltage relay 134 and high voltage relay 144 switch to couple the driver circuit 132 and high voltage output 146 to Cockcroft-Walton multiplier 142. This circuitry requires relay control logic 148 to be linked to control circuit 130, low voltage relay 134 and high voltage relay 144, in order to control the switching of relays 134 and 144. The circuitry used in the prior art of FIG. 1C makes significant advancements over the manual techniques illustrated in FIGS. 1A and 1B. However, the relay technique of FIG. 1C requires a high voltage relay (e.g. high voltage relay 144) which requires an expensive vacuum relay. Vacuum relays are expensive, due to the clean room production requirements, and are limited to maximum operating voltages based on the currently available technology. Furthermore, the high voltage relay technique requires two high voltage output circuits, a low voltage relay to switch the converter to the desired output, a high voltage relay to switch the output circuit to the appropriate polarity, and significant control circuitry to ensure no damage occurs to the relay and output circuits during switchover transitions. Accordingly, it is desirable to provide a high voltage power supply capable of being used in today's automated systems, wherein the expense of manufacture is decreased by eliminating the requirement of expensive high voltage vacuum relays, and the expense of providing dual multiplier circuits.

SUMMARY OF THE INVENTION

Generally speaking, in accordance with the invention, a high voltage power supply is provided. A high voltage power supply includes a high voltage output terminal. An input terminal for providing a voltage signal to the power supply. A voltage multiplier is provided for operating on an alternating voltage signal to generate high voltage across positive and negative polarity terminals. A member, for example an electromechanical transducer is provided for physically moving the multiplier circuit between a first position where the positive polarity terminal is electrically connected to the high voltage output terminal, and a second position where the negative polarity terminal is electrically connected to the high voltage output terminal.

An alternating current is generated by the power supply and input into the multiplier circuit of the power supply. The multiplier circuit and power supply output a high voltage output having either a positive polarity or a negative polarity. The multiplier circuit can be any well-known multiplier circuit, such as a Cockcroft-Walton multiplier. The position where the alternating current is input into the multiplier is constant; however, the ground connection and output connection to the multiplier determines the polarity of the output. The output of the power supply can be selectively changed by outputing the negative polarity terminal or positive polarity terminal to the high voltage output terminal.

Accordingly, it is an object of the invention to provide an improved high voltage power supply having negative and positive high voltage output capability.

It is another object of the invention to provide a high voltage power supply that does not require the use of vacuum relays.

Yet another object of the invention is to reduce the cost of manufacture of the high voltage power supply.

Still a further object of the invention is to provide a power supply that is safe and does not require manual switching of the high voltage terminals.

Still another object of the invention is to provide a high voltage power supply that can switch the polarity of the power supply fast enough for use in automated systems.

Still another object of the invention is to provide a high voltage power supply with no inherent limitations in minimum and maximum operating voltages.

Still other objects and advantages of the invention will, in part, be obvious and will, in part, be apparent from the specification.

The invention accordingly comprises a device possessing the features, properties, and the relation of components which will be exemplified in the device hereinafter described, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 4 is a top plan view of the multiplier circuity on a disk, and the motor element in accordance with the preferred embodiment of the invention;

FIG. 5 is a side elevational view of the multiplier circuitry mounted on a disk and the motor element in accordance with the preferred embodiment of the invention as depicted in FIG. 4;

FIG. 6 is a top plan view of the multiplier circuit mounted on a disk and the motor element for rotating same in accordance with an alternative embodiment of the invention;

FIG. 7 is a side elevational view of the multiplier circuitry mounted on a disk and the motor element for driving same in accordance with the embodiment of FIG. 6;

DETAILED DESCRIPTION OF THE PREFERRED EMBODIMENTS

Figure 2:
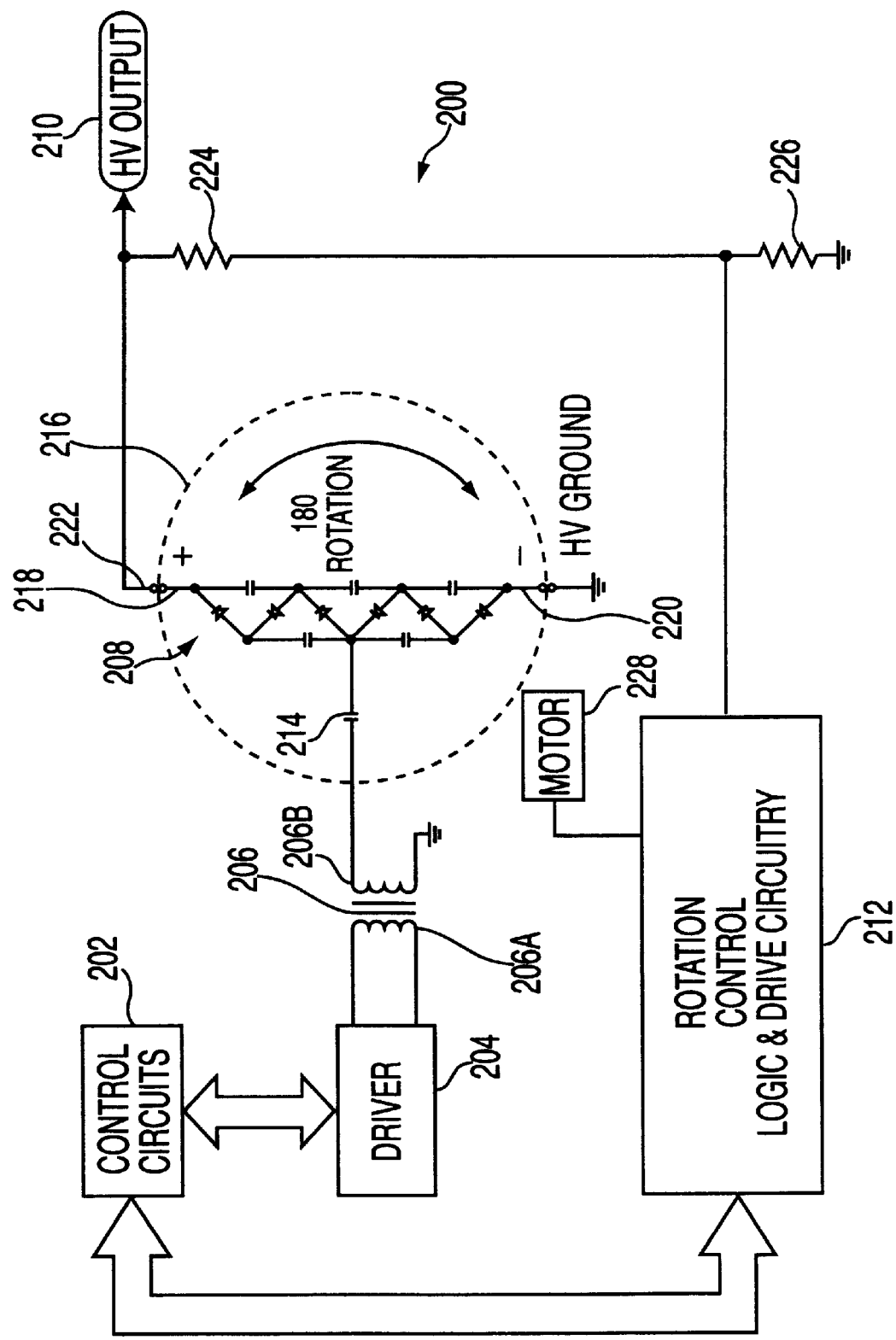
FIG. 2 is a diagrammatic illustration of a high voltage power supply in accordance with the preferred embodiment of the invention.

Reference is now made to FIG. 2 wherein a high voltage power supply, generally indicated as 200, constructed in accordance with the instant invention, is depicted. High voltage power supply 200 generally includes control circuits 202, a driver circuit 204, a transformer 206, a multiplier circuit generally indicated as 208, a high voltage output 210 and rotation control logic and drive circuitry 212.

Control circuits 202 are coupled to driver 204. Driver 204 is coupled to the primary windings of 206a of transformer 206. The secondary winding 206b, of transformer 206 is coupled at one end to ground, and at the second end to multiplier circuit 208. Particularly winding 206b is coupled to one pole of capacitor 214, and the second pole of capacitor 214 is coupled to multiplier circuit 208 in a center feed arrangement. Multiplier circuit 208 is generally known in the industry as a Cockcroft-Walton multiplier circuit. Multiplier circuit 208 is indicated as being mounted on a rotational disk indicated by dashed lines 216. The multiplier circuit includes a first, positive node 218 and a second, negative node 220. As shown in FIG. 2, negative node 220 is electrically coupled to ground and positive node 218 is coupled to node 222 which is electrically coupled to HV output 210. HV output 210 is also coupled through resistors 224 and 226 to ground. Furthermore, rotation control logic and drive circuit 212 is coupled to control circuits 202, and is also coupled through resistor 226 to ground. Rotation control logic and drive circuitry 212 is also coupled to motor 228 which is an electromechanical transducer and receives an electric signal and causes disk 216 to rotate.

The present high voltage power supply 200 selectively provides a positive polarity signal or a negative polarity signal at HV output 210. Control circuits 202 operate in conjunction with rotation control logic and drive circuitry 212 to selectively cause motor 228 to operate and thereby rotate disk 216 by 180°. Control circuit 202 also operates driver 204, to selectively provide a driving signal to multiplier circuit 208. Accordingly, during operation, control circuits 202 cause driver 204 to provide a driving signal through transformer 206 to multiplier circuit 208, such that multiplier circuit 208 provides a high voltage output at either positive node 218 or negative node 220. When high voltage power supply 200 is instructed to reverse the polarity at HV output 210, control circuits 202 instruct driver 204 to stop providing power to multiplier circuit 208, and thereby let the multiplier circuit 208 discharge. When the multiplier circuit 208 is adequately discharged, rotation control logic and drive circuitry 212 causes motor 228 to rotate disk 216 and thereby inverse the polarity of the high voltage signal at HV output 210. When polarity is inversed, control circuits 202 cause driver 204 to begin charging multiplier 208. Thus, HV output 210 provides a polarity inversed output.

Figure 3:
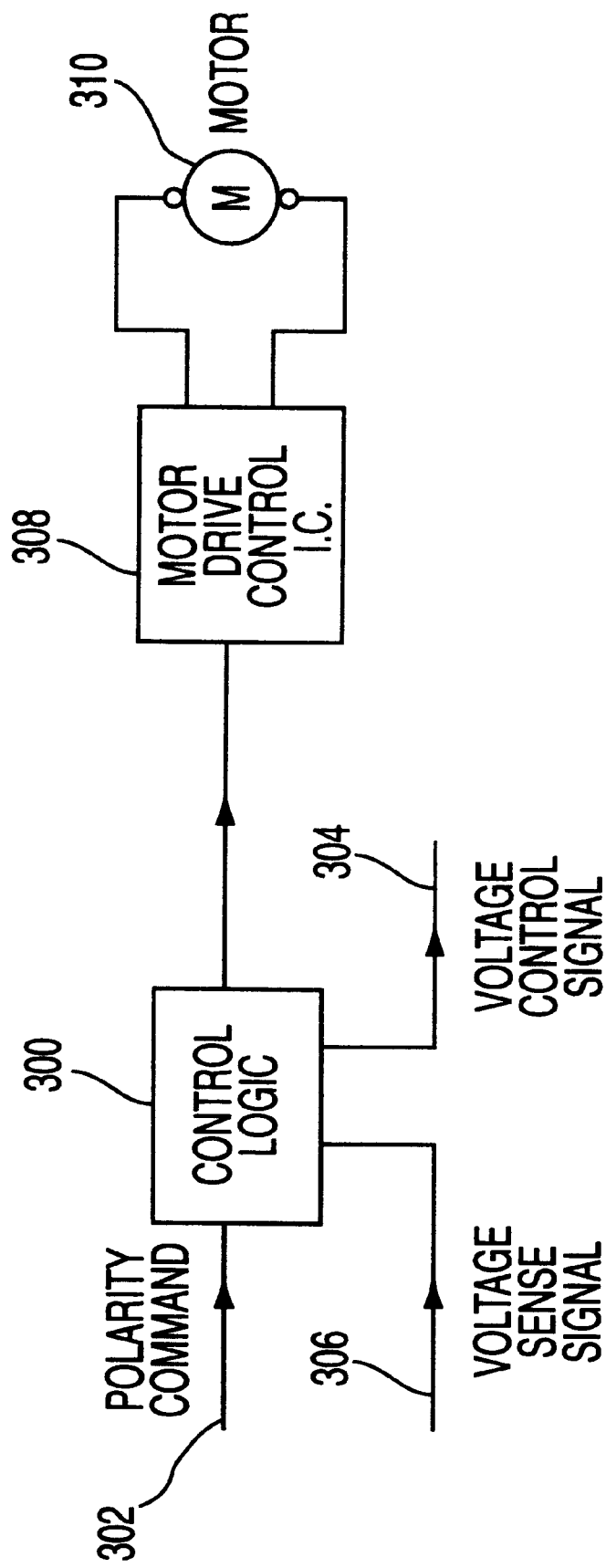
FIG. 3 is a block diagram of the driving logic of the motor in accordance with the preferred embodiment of the invention.

Reference is next made to FIG. 3, wherein a block diagram of the motor driving circuit is disclosed. The motor driving circuit of FIG. 3 is substantially incorporated within rotation control logic and driving circuitry 212 of FIG. 2. In particular, control logic 300 receives inputs and provides appropriate output to the motor driving circuitry. A polarity command 302 is input into control logic 300 and provides information regarding a change in the high voltage polarity desired. For instance, a polarity command signal of 0V may equal a positive polarity, and a polarity command of 5V may equal a negative polarity. Accordingly, when the polarity command signal is received, a voltage control signal 304 is output. The voltage control signal 304 would be output to control circuits 202 of FIG. 2, and would instruct the high voltage oscillator to shut down. This would cause the high voltage output to reduce to a value close to 0 volts. A voltage sense signal 306 would then be input into control logic 300 when the voltage sense signal senses a voltage in the appropriate range (close to 0 volts), the motor drive control IC 308 is activated. The motor drive control IC causes motor 310 to rotate, thereby causing the disk 216 of FIG. 2 to rotate by 180° and reverse the polarity at the HV output 210 of FIG. 2. In the preferred embodiment, the motor 310 can reverse the polarity of the multiplier circuit in less than 0.5 seconds. After the motor reverses the high voltage polarity, the high voltage oscillator is enabled by voltage control signal 304 and a high voltage appears at HV output 210.

Particular reference is next made to FIG. 4, wherein a top plan view of the first preferred embodiment of the invention, including the high voltage multiplier mounted on a disk is illustrated. The multiplier circuit located on the disk includes a plurality of capacitors 301, 303, 305, 307, 309, 311 and 313, as well as a plurality of diodes 315, 317, 319, 321, 323 and 325. The capacitors and diodes are electrically connected as shown in multiplier circuit 208 of FIG. 2. The electronic elements are preferably mounted on a disk-shaped printed wiring board or alternatively, the disk can be formed of molded plastic. The diameter D of disk 331 varies as a function of the voltage produced. In other words, if the voltage produced is large, a large diameter disk is required in order to house large capacitors, and to space the capacitors an appropriate distance apart and to prevent arcing. Disk 331 includes a first post 333 and a second post 335. First post 333 is the negative polarity node, similar to node 220 of FIG. 2, and post 335 is the positive polarity node, similar to node 218 of FIG. 2. A modified worm wheel section 337 is also provided. In the preferred embodiment the worm wheel is cut directly into the printed wiring board.

Motor 339 includes electrical contacts 341 for receiving a signal from the rotation control logic and drive circuitry 212 of FIG. 2. At the other end a spindle 343 is provided for rotating worm gear 345. Worm gear 345 when rotated causes the modified worm wheel 337 to rotate around pivot point 350 which is located in the center of disk 331. Pivot point 350 is any conventional post that allows for the rotational coupling of disk 331 to housing 300.

As depicted in FIGS. 4 and 5, negative polarity post 333 is in contact with high voltage output contact 353, and positive polarity post 335 is in contact with high voltage ground contact 355.

During operation, worm gear 345 is rotated by spindle 343 of motor 339 and cause the positive and negative polarity posts 335, 333 to bear against the high voltage output contact 353 and high voltage ground contact 355. When worm gear 345 is completely within disk portion 338*a* or 338*b*, wherein worm gear 345 is not in engagement with the teeth of worm wheel 337, the high voltage output contact 353 and high voltage ground contact 355 are bent as shown in FIG. 4 by posts 333 and 335. Thus, when rotation control logic and drive circuitry 212 of FIG. 2 provides an electronic signal to motor 339, for worm gear 345 to reverse spin direction, high voltage output contact 353 and high voltage ground contact 355 spring back to their original shape and cause disk 333 to begin rotation and allow worm gear 345 to contact the teeth of modified worm wheel 337. Thus, worm wheel 337 rotates disk 331 about pivot point 350.

Reference is next made to the alternative embodiment of FIGS. 6 and 7, wherein like reference numerals are used to represent like elements. This embodiment of the invention includes a disk 331 that houses the electronic elements.

A motor 401 is provided adjacent to disk 331. The motor includes a spindle 403 that is driven by the motor and is connected to a rotor 405. A belt 407 surrounds rotor 405 and also surrounds disk 331. Thus, when rotor 405 is caused to rotate by spindle 403, belt 407 rotates. The rotation of belt 407 also causes disk 331 to rotate. Similar to the first embodiment, posts 333 and 335 are provided for the negative polarity node and positive polarity node, respectively. Posts 333 and 335 on disk 331 are rotated until the posts contact either the high voltage output contact 411 or the high voltage ground contact 413. The high voltage output contact 411 is coupled to the high voltage output, and the high voltage ground contact is coupled to ground as diagrammatically illustrated in FIG. 2. Furthermore, the motor is connected to the rotation control logic and driving circuitry as diagrammatically shown in FIG. 2.

Figure 1A:
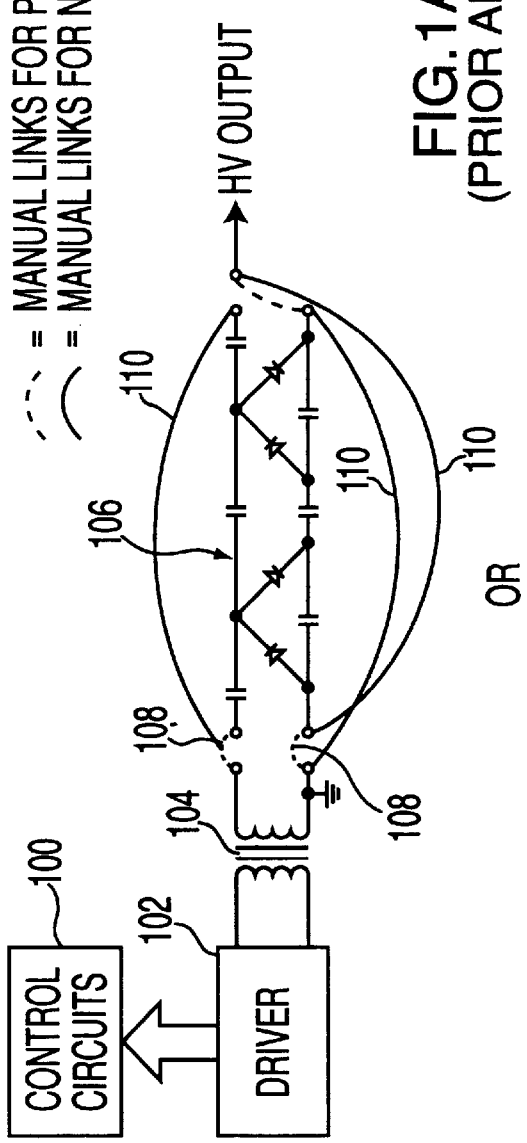
FIG. 1A is a diagrammatic representation of a prior art manually operated high voltage power supply.
Figure 1B:
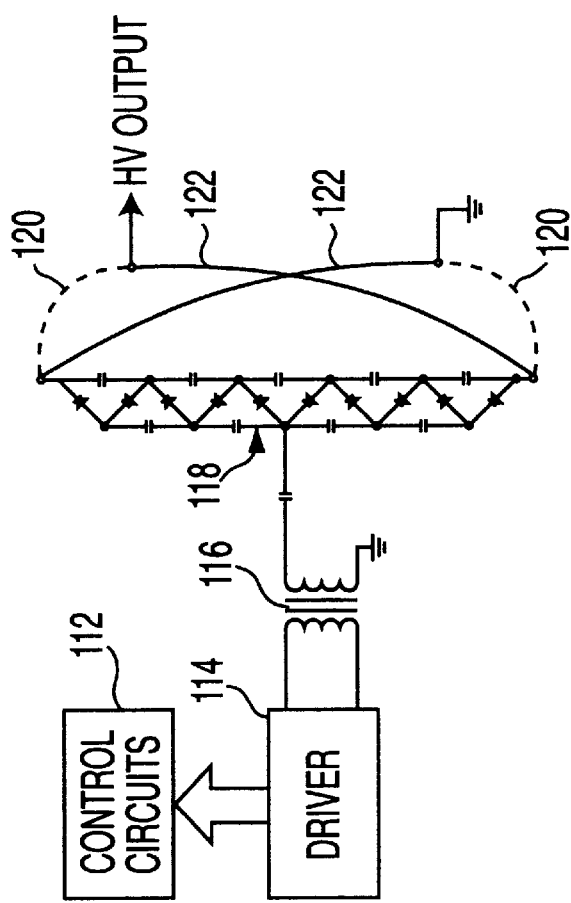
FIG. 1B is a diagrammatic illustration of a prior art manually operated high voltage power supply.
Figure 1C:
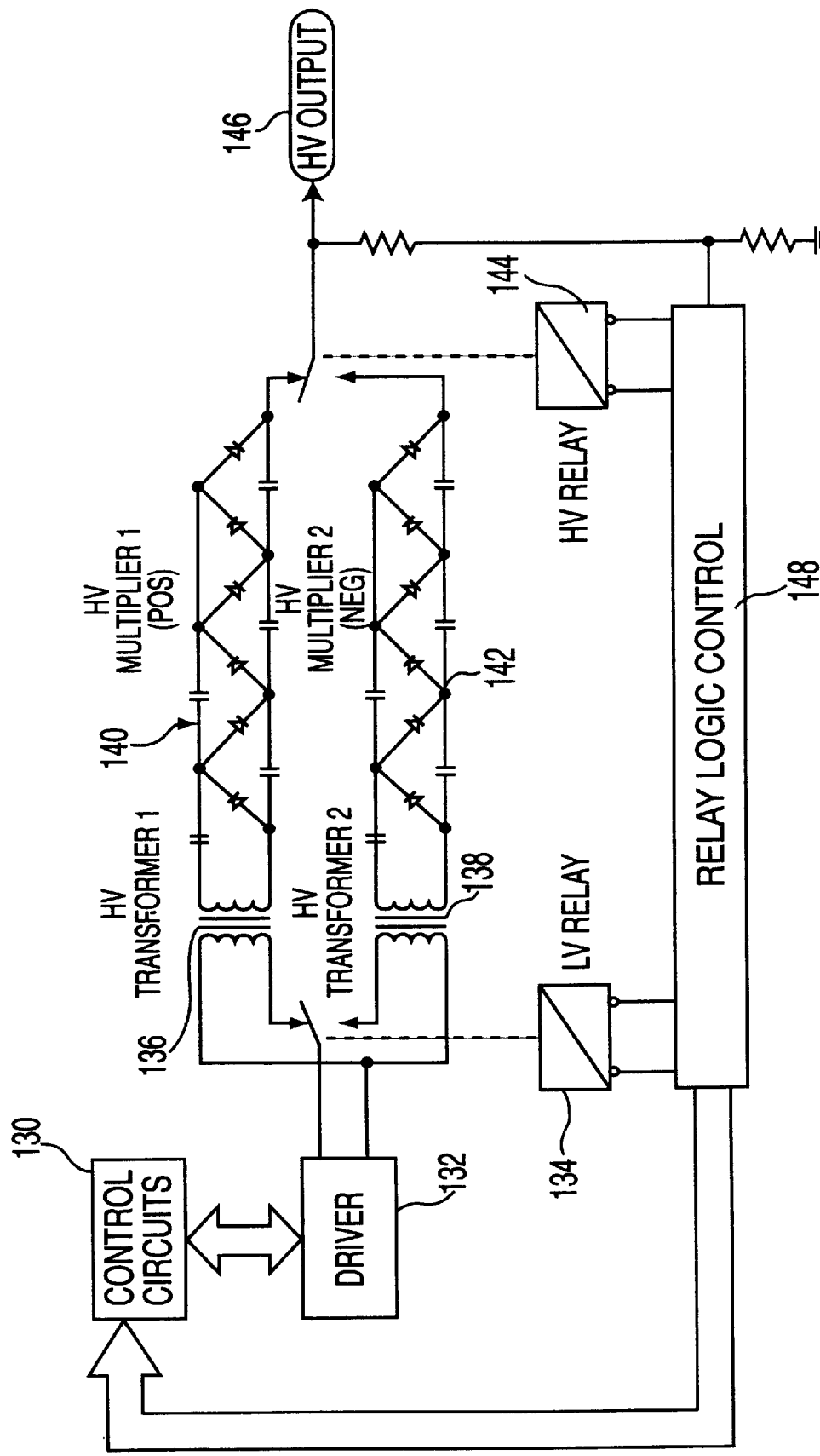
FIG. 1C is a diagrammatic representation of a prior art high voltage power supply using plural electromechanical relays.
Figure 8:
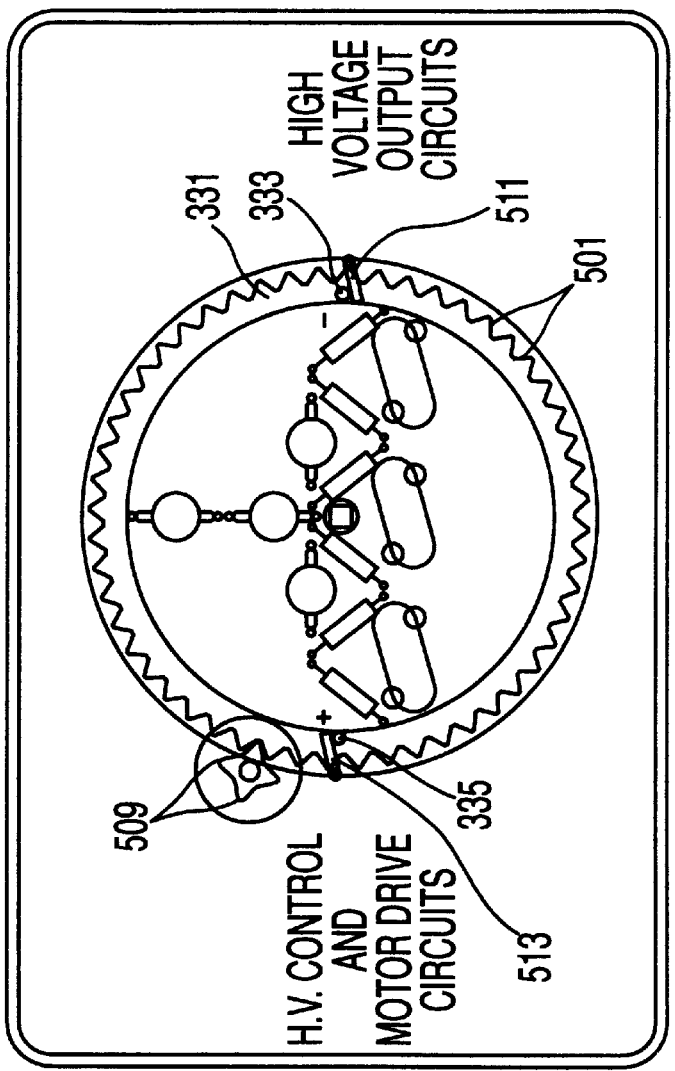
FIG. 8 is a top plan view of a second alternative embodiment of the electronic multiplier circuitry mounted on a disk and the motor element for rotating same.
Figure 9:
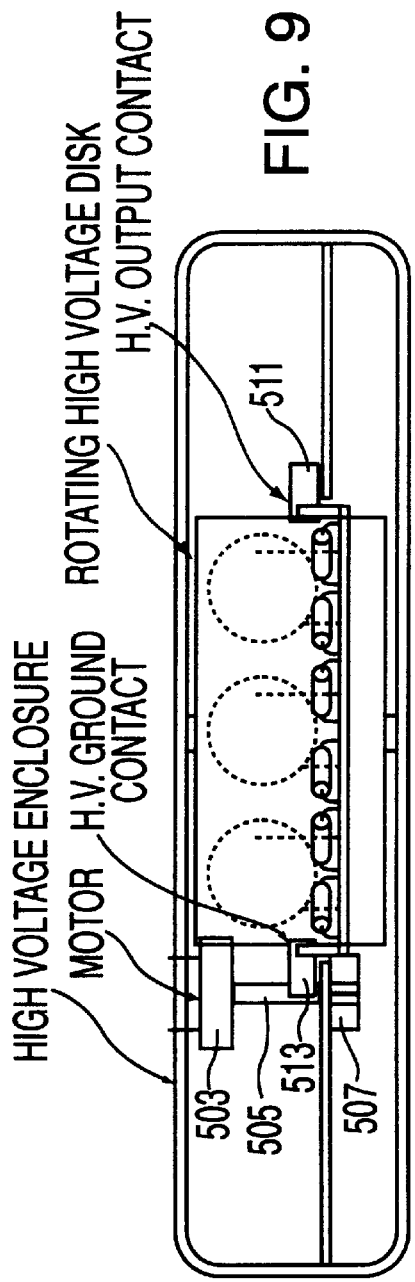
FIG. 9 is a side elevational view of the multiplier circuitry mounted on a disk and the motor element for driving same in accordance with the embodiment of FIG. 8.

Thus, the alternative embodiment of FIGS. 6 and 7 includes a similar motor mechanism to that of the first embodiment of FIGS. 4 and 5; however, the motor drives the disk 331 via a belt drive, rather than a worm gear interacting with a modified worm wheel. A second alternative embodiment is disclosed in FIGS. 8 and 9, which include electronics similar to that of FIGS. 1 and 2 mounted on a disk 331 which includes a negative polarity output post 333 and a positive polarity output post 335. The disk 331 includes an outer peripheral surface that has a tooth configuration generally indicated at 501.

A motor 503 is provided for driving the disk 331. The motor drives a spindle 505 which in turn rotates a sprocket 507. Sprocket 507 includes a plurality of teeth 509 for engaging the teeth 501 of disk 331. Accordingly, when motor 503 is turned on, it causes spindle 505 to rotate and sprocket 507 to rotate, thereby rotating disk 331.

As in the first alternative embodiment of FIGS. 6 and 7, the motor 503 rotates disk 331 until the positive and negative polarity posts 335, 333 engage the high voltage output contact 511 and high voltage ground contact 513. When it is desirable to change the polarity of the output signal (polarity command is received), the motor is reversed and positive and negative polarity posts 335, 333 alternate contact with the high voltage output contact 511 and high voltage ground contact 513.

As stated above, when a positive polarity high voltage is desired, the positive polarity high voltage post 335 contacts the high voltage output contact 511 and the negative polarity posts 333 contacts the high voltage ground contact 513. Alternatively, when a high voltage negative output is desired the negative output post 333 contacts the high voltage output contact 511 and the positive polarity posts 335 contacts the high voltage ground contact 513.

As stated above, electronic contacts are made as shown diagrammatically in FIG. 2.

Figure 10:
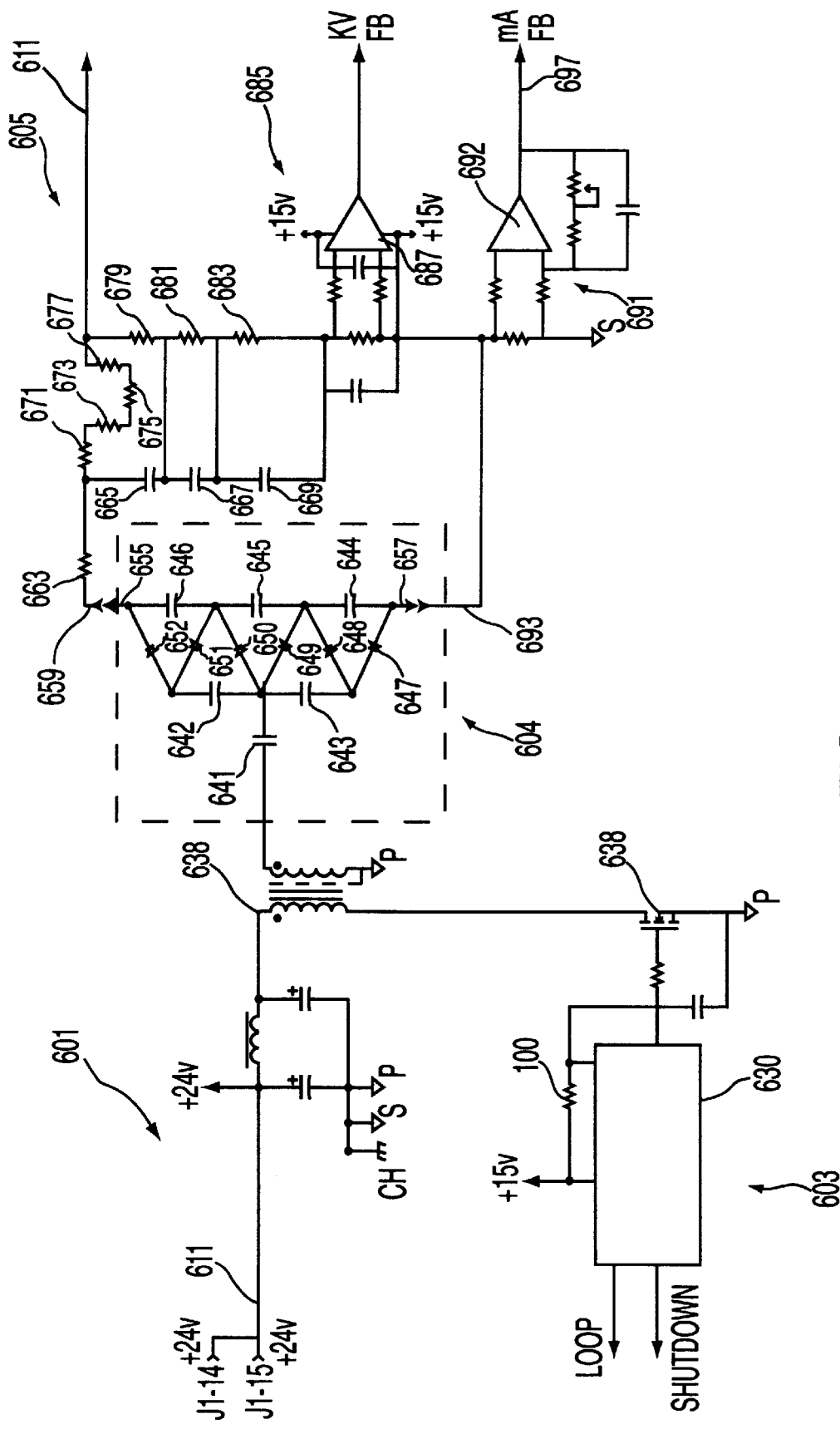
FIG. 10 is a schematic representation of the electronic circuitry in accordance with the preferred embodiment of the invention.
Figure 11:
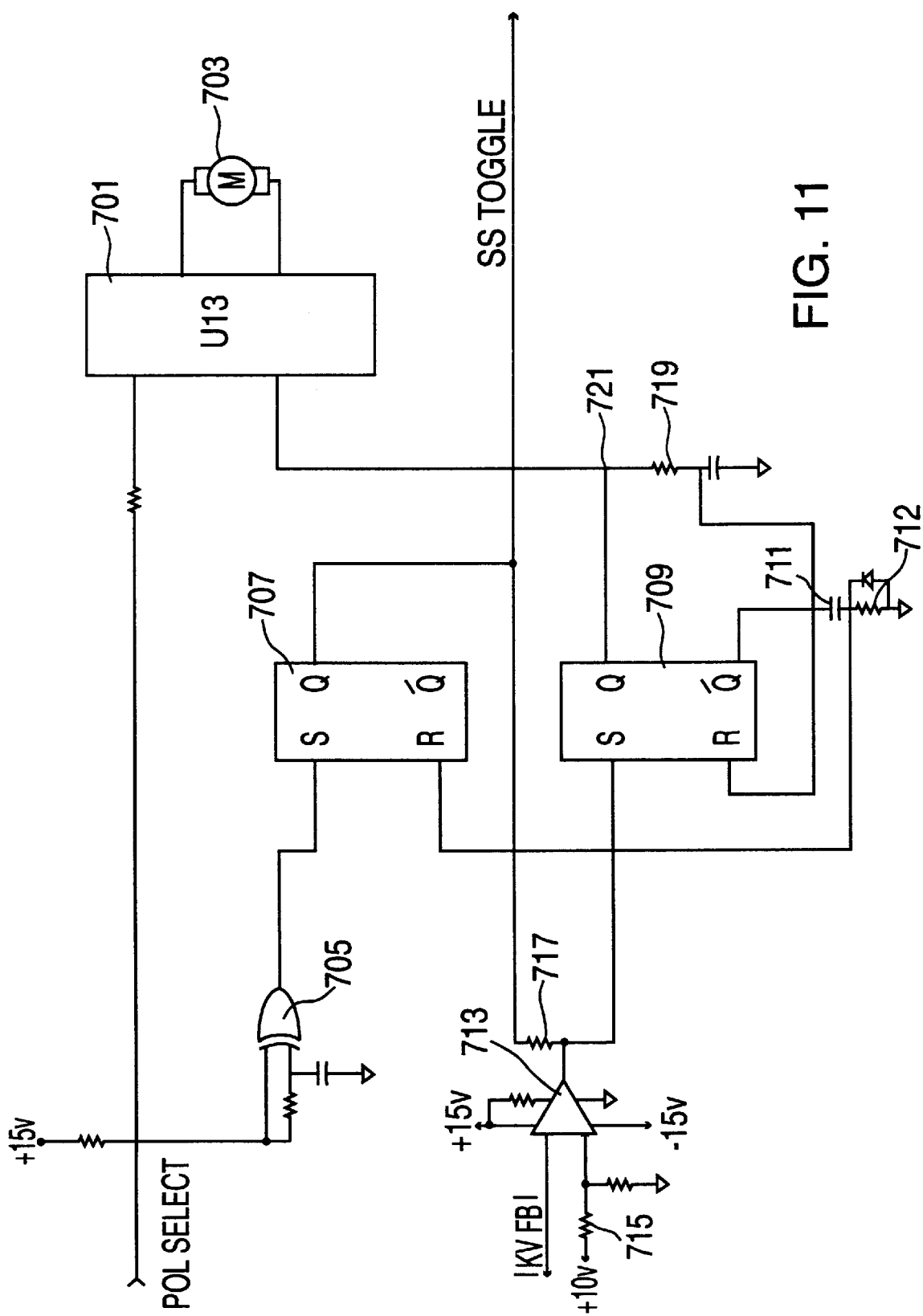
FIG. 11 is a schematic representation of the motor driving circuitry.

Particular reference is next made to FIGS. 10 and 11, which are schematic representations of the high voltage power supply. FIG. 10 represents the general power supply circuitry which receives a 24V input and produces a 30 KV output. FIG. 11 is a schematic representation of the motor driving circuitry.

With particular reference to FIG. 10, the high voltage power supply receives a DC input of 24 volts, and outputs approximately 30 kv (positive or negative polarity) at 300 microamps. The power supply includes a voltage input section, generally indicated at 601, an invertor circuit 603, a voltage multiplier section, generally indicated at 604, and an output section, generally indicated at 605.

The voltage input section 601 includes an input port 611 for receiving a 24 V DC input. An inductor 619 and capacitors 621 and 623 are provided to filter the 24 V source and provide a filtered DC signal to invertor circuit 603.

Inverter circuit 603 receives the 24 V DC input, and outputs an AC signal of approximately 10,000V peak to peak. Invertor circuit 603 includes a regulating pulse width modulator chip 630, such as a UC 3525A, which is produced by many companies including for example Unitrode. The output from the pulse width modulator chip 630 is coupled to the gate of FET 632. The source of FET 632 is coupled to ground and the drain is coupled to one winding of transformer 638.

Transformer 638 steps up the AC voltage produced by pulse width modulator chip 630 which passes through FET 632. Transformer 638 is coupled to multiplier section 604.

Multiplier section 604 includes a Cockcroft-Walton multiplier identified as 640. The Cockcroft-Walton multiplier includes six capacitors 641–646, and six diodes 647–652. Multiplier 640 includes an HV positive polarity output 655, and an HV negative polarity output 657. Multiplier section 604 is selectively rotatable as described above, such that terminal 659 is electrically connected to either HV positive polarity output 655 or HV negative polarity output 657 depending upon the desired output at HV output terminal 661.

Terminal 659 is connected to resistor 663 and capacitors 665, 667, 669 which provide a filtering function, so that the high voltage signal received at terminal 659 and output at HV output terminal 661 is a low ripple DC signal with substantially no AC component. A plurality of resistors 671, 673, 675, 677 provide a high impedance, and are known in the art as short circuit limit resistors. In other words, if HV output terminal 661 is short circuited to ground, resistors 671–677 will protect the power supply and the load.

Resistors 679, 681, 683 are connected to HV output terminal 661 at one end, and to feedback circuit 685 at the other end. Feedback circuit 685 includes an operational amplifier 687, and the output of the operational amplifier is connected to a meter for determining output voltage. In particular, resistors 679, 681 and 683 provide a resistance of 100 MΩ each or 300 MΩ when viewed in series. This value is high, and accordingly, a voltage divider is formed, where a low current passes through resistors 679, 681 and 683.

A current sensing circuit 691 is coupled to node 693 which is electrically coupled to either the HV positive polarity output 655 or the HV negative polarity output 657. It is connected to the output that is not connected to terminal 659. Current sensing circuit 691 includes an operational amplifier 692, and the output 697 of current sensing circuit 691 is coupled to a meter (not shown).

FIG. 10 schematically depicts the major components of the power supply, wherein a DC voltage (preferably 24V) is at voltage input 601. The signal is filtered and a "clean" DC signal is input into interior circuit 603. The invertor circuit includes pulse width modulator chip 630 and outputs an AC voltage. The AC voltage is stepped up in transformer 638. This higher voltage is input to multiplier circuit 604. Multiplier circuit 604 selectively provides either a high voltage positive or negative output.

The high voltage output is filtered to provide a DC signal with essentially no AC component. A voltage sense circuit 685 and a current sense circuit 691 are both provided to monitor the output at HV output terminal 661.

Attention is next directed to FIG. 11 where the polarity command is coupled to a driver 701. The driver is coupled to a motor 703. Motor 703 rotates the multiplier circuit as described above.

The polarity command is coupled to the input of an exclusive OR gate 705. The output of exclusive OR gate 705 is coupled to the S input of SR flip flop 707. The R input of SR flip flop 707 is coupled to capacitor 711 which is coupled to the Q output of flip flop 709. Capacitor 711 is also coupled to resistor 712 and diode 710 which are in parallel and coupled to ground. Capacitor 711 will receive a charge from flip flop 709 and will discharge through resistor 712.

The KV FB signal from voltage sensing circuit 685 of FIG. 10 is electrically connected to the negative input of amplifier 713. The positive input of amplifier 713 is coupled to a 10 volt source through a resistor 715. The output of amplifier 713 is coupled to the S input of SR flip flop 709, and is also coupled to resistor 717 which is connected to the SS toggle.

The R input of flip flop 709 is connected to resistor 719 which is in turn coupled to driver 701. Resistor 719 and driver 701 are electrically connected at node 721, and the Q output of SR flip flop 709 is also electrically coupled to node 721.

Driver 701 is a Dual-H Driver, such as a CA3275 produced by Harris semiconductor. The driver receives a high or low from the polarity command and a second high or low signal from the Q output of flip flop 709. The outputs from driver 701 cause motor 703 to spin clockwise, spin counterclockwise or not to spin.

FIGS. 10 and 11 are linked together by the KV FB signal which is the output of voltage sense circuit 685 of FIG. 10. In other words, when the output voltage is high the KV FB will be large and the motor will not spin. Alternatively, when the output voltage of the power supply is low enough, and the polarity command is received, the motor will spin.

This invention provides a power supply that automatically changes polarity in response to a polarity command. The polarity is switched by physically moving the multiplier circuit such that the negative or positive polarity posts of the multiplier circuit contact the HV output. When the polarity command is received, the high voltage is first turned off, and the high voltage is dissipated. Once the voltage reaches a certain low level, a motor is energized and the posts of the multiplier circuit are physically moved, and the polarity at the HV output is reversed.

In the preferred embodiment of the invention as illustrated in FIGS. 4–9, the multiplier circuit is mounted on a disk, and the disk is rotated to change the polarity. When high voltages are created, large spacing is required between the resistors and capacitor in the multiplier circuit in order to eliminate arching. Furthermore, the multiplier circuit is preferably encased in insulating material in order to further prevent arching. Accordingly, production in a vacuum is not required.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A high voltage power supply, comprising:
   a high voltage output terminal;
   input means for providing a voltage signal;
   a unitary voltage multiplier circuit having an input terminal means and an output terminal means including a positive and a negative terminal for operating on said voltage signal to generate a high voltage between said positive and negative terminal; and means for moving said voltage multiplier circuit in an intact condition in response to an electrical instruction signal between the first position wherein said positive terminal is electrically connected to said high voltage output terminal, and a second position wherein said negative terminal is electrically connected to said high voltage output terminal.

2. The high voltage power supply of claim 1, wherein the moving means includes an electromechanical transducer.

3. The high voltage power supply of claim 2, wherein the electromechanical transducer is an electric motor.

4. The high voltage power supply of claim 3, wherein the motor includes a rotary spindle.

5. The high voltage power supply of claim 4, further including a disk, wherein said voltage multiplier circuit is mounted on said disk.

6. The high voltage power supply of claim 5, further including means for transferring motion of said spindle to said disk.

7. The high voltage power supply of claim 6, wherein said transfer means includes said disk having an edge having a plurality of teeth, and said spindle coupled to a worm gear, and said worm gear engages said teeth of said disk to rotate said disk.

8. The high voltage power supply of claim 6, wherein said transfer means includes a belt drive.

9. The high voltage power supply of claim 6, wherein said transfer means include a sprocket arrangement.

10. The high voltage power supply of claim 1, wherein said voltage multiplier circuit includes a Cockcroft-Walton multiplier.

11. The high voltage power supply of claim 1, wherein said multiplier circuit include a plurality of capacitors and a plurality of diodes.

12. The high voltage power supply of claim 1, wherein said multiplier circuit is mounted on a disk.

13. The high voltage power supply of claim 12, further including a housing.

14. The high voltage power supply of claim 13, wherein said disk is rotationally mounted on said housing.

15. The high voltage power supply of claim 14, wherein said moving means includes an electric motor coupled to said disk for rotating said disk.

16. The high voltage power supply of claim 12, wherein said disk is a printed wiring board.

17. The high voltage power supply of claim 16, wherein said printed wiring board includes an edge having a plurality of teeth.

* * * * *